United States Patent
Murugesan et al.

(10) Patent No.: US 10,739,269 B2
(45) Date of Patent: *Aug. 11, 2020

(54) DETECTION OF TRACE CHEMICALS IN OIL AND GAS APPLICATIONS

(71) Applicants: Sankaran Murugesan, Katy, TX (US); Radhika Suresh, Sugar Land, TX (US); Valery N. Khabashesku, Houston, TX (US); Qusai Darugar, Houston, TX (US); Stephen Mark Heath, Merseyside (GB)

(72) Inventors: Sankaran Murugesan, Katy, TX (US); Radhika Suresh, Sugar Land, TX (US); Valery N. Khabashesku, Houston, TX (US); Qusai Darugar, Houston, TX (US); Stephen Mark Heath, Merseyside (GB)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/164,011

(22) Filed: Oct. 18, 2018

(65) Prior Publication Data
US 2020/0124534 A1    Apr. 23, 2020

(51) Int. Cl.
*G01N 21/65* (2006.01)
*C09K 8/52* (2006.01)
*E21B 49/08* (2006.01)

(52) U.S. Cl.
CPC .......... *G01N 21/658* (2013.01); *C09K 8/52* (2013.01); *E21B 49/08* (2013.01); *E21B 2049/085* (2013.01)

(58) Field of Classification Search
CPC ........ G01N 21/658; C09K 8/52; E21B 49/08; E21B 2049/085
See application file for complete search history.

(56) References Cited

U.S. PATENT DOCUMENTS 8,070,956 B2  12/2011  Peterman et al.
8,414,755 B2   4/2013  Peterman
(Continued)

FOREIGN PATENT DOCUMENTS

| EP | 1660320 B1 | 5/2013 |
|---|---|---|
| WO | 2009102598 A1 | 8/2009 |
| WO | 2010057212 A1 | 5/2010 |

OTHER PUBLICATIONS

Benhabib et al. "Surface-Enhanced Raman Spectroscopy for Rapid and Cost-Effective Quantification of Amines in Sour Water", SPE-177406-MS, Society of Petroleum Engineers; Abu Dhabi International Petroleum Exhibition and Conference, Abu Dhabi, UAE; Nov. 9-12, 2015; 6 pages.

(Continued)

*Primary Examiner* — Dominic J Bologna
(74) *Attorney, Agent, or Firm* — Cantor Colburn LLP (57) ABSTRACT

A method of analyzing a well sample for a well treatment additive includes contacting the sample with functionalized metallic nanoparticles that contain metallic nanoparticles functionalized with a functional group including a cyano group, a thiol group, a carboxyl group, an amino group, a boronic acid group, an aza group, an ether group, a hydroxyl group, or a combination including at least one of the foregoing; irradiating the sample contacted with the functionalized metallic nanoparticles with electromagnetic radiation at a selected energy level; measuring a Raman spectrum emitted from the sample; and determining presence, type or concentration of the well treatment additive in the sample from the Raman spectrum.

18 Claims, 3 Drawing Sheets

(56) References Cited

U.S. PATENT DOCUMENTS

| | | | |
|---|---|---|---|
| 8,702,976 | B2 | 4/2014 | Peterman |
| 8,741,151 | B2 | 6/2014 | Hails et al. |
| 8,792,095 | B2 | 7/2014 | Piorek et al. |
| 8,917,389 | B2 | 12/2014 | Piorek et al. |
| 8,999,263 | B2 | 4/2015 | Peterman et al. |
| 9,036,144 | B2 | 5/2015 | Lee |
| 2004/0180379 | A1 | 9/2004 | Duyne et al. |
| 2009/0225310 | A1 | 9/2009 | Yang et al. |
| 2009/0279073 | A1 | 11/2009 | Sardashti et al. |
| 2009/0311798 | A1 | 12/2009 | Wimberger-Friedl et al. |
| 2010/0276310 | A1 | 11/2010 | Chen et al. |
| 2011/0007310 | A1* | 1/2011 | Sardashti ............... G01N 21/03 356/311 |
| 2012/0225493 | A1 | 9/2012 | Piorek et al. |
| 2012/0236304 | A1 | 9/2012 | Lee et al. |
| 2012/0280209 | A1 | 11/2012 | Bonnell et al. |
| 2013/0244337 | A1 | 9/2013 | Meinhart et al. |
| 2013/0271758 | A1* | 10/2013 | Marchant ............... B82Y 15/00 356/301 |
| 2013/0293884 | A1 | 11/2013 | Lee et al. |
| 2014/0125976 | A1 | 5/2014 | Kim et al. |
| 2014/0166863 | A1* | 6/2014 | Yamada ................. G01N 21/65 250/216 |
| 2014/0186939 | A1 | 7/2014 | Peterman et al. |
| 2014/0275685 | A1 | 9/2014 | Sanchezvalente et al. |
| 2014/0373649 | A1* | 12/2014 | Harrell ................... G01N 17/00 73/866 |
| 2015/0362433 | A1* | 12/2015 | Zhou ................. G01N 33/5432 506/9 |
| 2016/0033415 | A1* | 2/2016 | Meinhart ............... G01N 21/05 435/34 |
| 2016/0177698 | A1* | 6/2016 | Schultheiss ............ E21B 43/26 166/250.1 |
| 2016/0290923 | A1 | 10/2016 | Nuutinen et al. |
| 2017/0074799 | A1 | 3/2017 | Peterman et al. |
| 2017/0315061 | A1 | 11/2017 | Ventura et al. |
| 2018/0067054 | A1* | 3/2018 | Suresh ................. G01N 21/658 |
| 2018/0298277 | A1* | 10/2018 | Borrell ................... C09K 8/035 |

OTHER PUBLICATIONS

Duggan, et al. "Multiple Corrosion Mechanisms in Crude Distillation Overhead System", Conference Paper NACE-09332, NACE International, Corrosion; Atlanta, GA; Mar. 22-26, 2009; 7 pages.

International Search Report, International Application No. PCT/US2017/050600, dated Dec. 19, 2017, Korean Intellectual Property Office; International Search Report 3 pages.

International Written Opinion, International Application No. PCT/US2017/050600, dated Dec. 19, 2017, Korean Intellectual Property Office; International Written Opinion 7 pages.

Lack, Joel E. "An In-Depth Look At Amine Behavior in Crude Units Using Electrolyte-Based Simulation"; Conference Paper No. 05570, Corrosion; Houston, TX; Apr. 3-7, 2005; 16 pages.

Lee, et al., "Selective and Rapid Room Temperature Detection of H2S Using Gold Nanoparticle Chain Arrays", Electroanalysis; vol. 23, Issue 11; Nov. 2011; pp. 2623-2628.

Mady et al.; "Overview of the Synthesis of Salts of Organophosphonic Acids and Their Application to the Management of Oilfield Scale"; Energy Fuels; 31; pp. 4603-4615; (2017).

Obied et al. "Polymer-Based Scale Inhibitors for Seawater Injection Operations in High-Salinity Formation Water Reservoirs"; SPE-177417-MS Society of Petroleum Engineers; Abu Dhabi International Petroleum Exhibition & conference held in Abu Dhabi, UAE; Nov. 9-12, 2015; 17 pages.

Poynton et al.; "Development of a New Tagged Polymeric Scale Inhibitor with Accurate Low-level Residual Inhibitor Detection, for Squeeze Applications"; SPE International; SPE 155187; 9 pages; Presented at the SPE International Conference and Exhibition on Oilfield Scale held in Aberdeen, UK, May 30-31; (2012).

Preston et al. "Recent Advances in Crude Unit Corrosion Control", Australian Corrosion Association Inc Victorian Branch, Technical Presentation, Jun. 2001; 17 pages.

Vuori et al.; "Accurate Detection of Tagged Polymeric Scale Inhibitors in Oilfield Produced Water Samples"; Society of Petroleum Engineers; SPE-179908-MS; Presentation at the SPE International Oilfield Scale Conference and Exhibition held in Aberdeen, Scotland, UK, 11 pages; May 11-12, (2016).

European Search Report for European Application No. 17849578.4 dated Mar. 30, 2020, 11 pages.

Myoung, N. et al: "Surface-enhanced Raman scattering detection of toluene and dichlorobenzene vapors using 1-propanethiol-linked Ag nanoparticles"; Journal of Nanophotonics, vol. 8, No. 1; 2014; pp. 83083-083083-7.

* cited by examiner

DETECTION OF TRACE CHEMICALS IN OIL AND GAS APPLICATIONS

BACKGROUND

The present disclosure is directed to a method for detecting chemicals, and, in particular, to a method of using Surface Enhanced Raman Spectroscopy (SERS) to detect, identify and/or determine concentrations of trace chemicals in oil and gas applications.

Petroleum is recovered from subterranean reservoirs through the use of drilled wells and production equipment. Oil and natural gas are found in, and produced from, porous and permeable subterranean formations, or reservoirs. Generally, the life cycle of an oil and/or gas well includes drilling to form a wellbore, casing, cementing, stimulation, and enhanced or improved oil recovery.

Many fluids are employed during the life cycle of an oil and/or gas well. For example, in order to improve extraction of oil and/or gas, well treatment additives are incorporated into various fluids utilized during the life cycle of an oil and/or gas well. The concentration of well treatment additives such as phosphonate scale inhibitors is currently measured by phosphorous content via Inductively Coupled Plasma (ICP) which measures the intensities of element-specific atomic emissions produced when the solution components enter the high-temperature plasma. Additional methods for detection of typical additives like scale and corrosion inhibitors include colorometric UV/visible spectroscopy, the hyamine turbidity chemical method, fluorescence, HPLC, HPLC/mass spectrometry (HPLC/MS), GC/MS (mainly corrosion inhibitors) and Time-Resolved Fluorescence (TRF). However, each of these methods has limitations in terms of the detection limit and specific analytes to be detected, and generally involve tedious data analysis, particularly HPLC/MS and GC/MS. What is needed are new methods which allow the determination of well treatment additives, particularly at low concentrations, which are applicable to a wide range of well additives, are not complex in terms of the method and data interpretation and can also be used on site for "near" on line measurements.

SUMMARY

A method of analyzing a well sample for a well treatment additive includes contacting the sample with functionalized metallic nanoparticles that contain metallic nanoparticles functionalized with a functional group including a cyano group, a thiol group, a carboxyl group, an amino group, a boronic acid group, an aza group, an ether group, a hydroxyl group, or a combination including at least one of the foregoing; irradiating the sample contacted with the functionalized metallic nanoparticles with electromagnetic radiation at a selected energy level; measuring a Raman spectrum emitted from the sample; and determining presence, type or concentration of the well treatment additive in the sample from the Raman spectrum.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed method are presented herein by way of exemplification and not limitation with reference to the Figures.

There is a strong need for robust analytical techniques for the detection of well treatment additives, particularly methods that provide for speciation of chemicals at low concentrations. The inventors have found that Surface Enhanced Raman Spectroscopy (SERS) is particularly well-suited for the analysis of well treatment additives, for example, scale and corrosion inhibitors in brine. SERS can be used to differentiate different phosphonate-based chemicals such as those found in scale inhibitors at low concentrations, as well as other trace chemicals. The methods described herein allow the detection and quantification of chemicals down to 1 part per million (ppm). In addition, the results can be quickly generated without performing multiple tedious steps.

Surface Enhanced Raman Spectroscopy (SERS) is a surface-sensitive detection technique that is used to detect molecules adsorbed on rough metal surfaces or nanostructures. The methods described herein use functionalized metallic nanoparticles as a SERS substrate. The unique substrate provides enhancements in Raman signals of the adsorbed molecules in an order of up to $10^6$. The enhancement allows the detection and/or measurement of chemicals at parts per million (ppm) or even parts per billion (ppb) levels. Moreover, the functionalized metallic nanoparticles have a unique and strong peak which can be used as an internal standard for calibration purpose so that the results are consistent from batch to batch.

In an embodiment, a method of analyzing a well sample for a well treatment additive comprises contacting the sample with functionalized metallic nanoparticles that contain metallic nanoparticles functionalized with a functional group comprising a cyano group, a thiol group, a carboxyl group, an amino group, a boronic acid group, an aza group, an ether group, a hydroxyl group, or a combination comprising at least one of the foregoing; irradiating the sample contacted with the functionalized metallic nanoparticles with electromagnetic radiation at a selected energy level; measuring a Raman spectrum emitted from the sample; and determining presence, type or concentration of the well treatment additive in the sample from the Raman spectrum.

In an aspect, determining presence, type or concentration of the well treatment additive in the sample from the Raman spectrum comprises identifying two or more species of well treatment additive in the sample.

The functionalized metallic nanoparticles comprise metallic nanoparticles functionalized with a functional group comprising a cyano group, a thiol group, a carboxyl group, an amino group, a boronic acid group, an aza group, an ether group, a hydroxyl group, or a combination comprising at least one of the foregoing. Cyano groups are preferred. In an embodiment, the functionalized metallic nanoparticles are free of sulfur or any sulfur-containing moieties. In another embodiment the functionalized metallic nanoparticles are not associated with sulfur or any sulfur-containing moieties or compounds. The functionalized metallic nanoparticles include gold, silver, or a combination comprising at least one of the foregoing. Gold nanoparticles are preferred. In a specific exemplary embodiment, the functionalized metallic nanoparticles are gold nanoparticles functionalized with a cyano group.

One way to functionalize the metallic nanoparticles is to treat a precursor of metallic nanoparticles with a reducing agent. Exemplary precursors include chloroauric acid, gold (III) chloride; gold (III) iodide, trichloro(pyridine)gold(III), chloro(triphenylphosphine)gold(I), gold(I) cyanide, gold (III) bromide, gold(I) sulfide, gold(III) hydroxide, chloro (triethylphosphine)gold(I), methyl(triphenylphosphine)gold (I), or a salt thereof. Exemplary salts include a sodium salt or a potassium salt such as potassium gold (III+) chloride. Exemplary reducing agents include an amino acid such as glycine and aspartic acid. The reaction can be conducted at a temperature of about 15° C. to about 50° C. Higher or lower temperatures can be used to expedite or slow down the reaction. The reaction is conducted at a pH of greater than 7, for example greater than about 7 to less than or equal to about 14, or greater than about 8 and less than about 12. As a specific example, functionalized gold nanoparticles are prepared by treating a gold nanoparticle precursor such as chloroauric acid or a salt thereof such as KAuCl4 with glycine at a pH of greater than about 7.

In an embodiment, the functional group is covalently bonded to the metallic nanoparticles. The functional group can be directly bonded to the metallic nanoparticles without any intervening atoms. Alternatively, the functional group is bonded to the metallic nanoparticles via one or more intervening atoms or moieties. The functional groups can be present in an amount of about 0.1 wt. % to about 60 wt. %, about 1 wt. % to about 20 wt. %, or about 5 wt. % to about 15 wt. %, each based on the total weight of the functionalized metallic nanoparticles.

The functionalized metallic nanoparticles have an average particle size, in at least one dimension, of less than one micrometer. As used herein "average particle size" refers to the average particle size based on the largest linear dimension of the particle (sometimes referred to as "diameter"). Particle size, including average, maximum, and minimum particle sizes, may be determined by an appropriate method of sizing particles such as, for example, static or dynamic light scattering (SLS or DLS) using a laser light source. In an embodiment, the functionalized metallic nanoparticles have an average particle size of about 1 to about 500 nanometers (nm), specifically 2 to 250 nm, more specifically about 5 to about 150 nm, more specifically about 10 to about 125 nm, and still more specifically about 15 to about 75 nm or about 20 to about 50 nm.

Without wishing to be bound by theory, it is believed that functionalized metallic nanoparticles enhance the Raman signature of certain chemicals, allowing these chemicals to be quantified at ppm or even sub ppm levels with sufficient accuracy. Further, the functionalized metallic nanoparticles have a unique Raman peak, which can be used as an internal reference. The unique Raman peak can be a peak at about 2,000 cm$^{-1}$ to about 2,300 cm$^{-1}$, about 2,100 cm$^{-1}$ to about 2,200 cm$^{-1}$, or about 2152 cm$^{-1}$ on a Raman spectrum. Without wishing to be bound by theory, it is believed that the unique Raman peak is generated by the functional group bonded to the metallic nanoparticles. Advantageously, the Raman peak does not overlap with the bands generated by the chemicals to be analyzed.

In an embodiment, no internal references are added to the functionalized metallic nanoparticles or used together with the sample to be analyzed. As used herein, internal references include any reference compounds with known structures and/or known amounts, which are used to calibrate the Raman intensity of the bands of an analyte.

Exemplary internal references include but are not limited to 4-nitro thiophenol, 4-mercapto benzoic acid, 4-bromothiophenol, 2-mercaptopyridine (MPy), benzenethiol (BT), 3,4-dichlorobenzenethiol (DBT), 3-fluorothiophenol (3-FTP), 4-fluorothiophenol (4-FTP), 3,5-bis(trifluoromethyl)benzenethiol (3-FMBT), methylene blue (MB), Nile blue A (NBA), and rhodamine 6G (R6G). Decanethiol, Octadecane thiolate, 4-mercaptobenzoic acid (MBA), and 1,4-benzenedithiol, 4-aminobenzenethiol (4-ATP), 2-naphthalenethiol (2-NT), 4-bromobenzenethiol (4-BBT), 4-chlorobenzenethiol (4-CBT), 4-fluorobenzenethiol (4-FBT), 3,4-dichlorobenzenethiol (3,4-DCT), benzenethiol (BT), 3,5-dichlorobenzenethiol (3,5-DCT), and 2-mercapto-6-methylpyridine (2-MMP). Although not needed, an internal reference can also be optionally used.

Functionalized metallic nanoparticles can be used in different ways. In an embodiment, a substrate for SERS is a sol or colloidal suspension of functionalized metallic nanoparticles in a fluid such as water. The concentration of the functionalized metallic nanoparticles is about 0.01 wt. % to about 70 wt. %, about 1 wt. % to about 25 wt. %, or about 5 wt. % to about 20 wt. %, based on the total weight of the sol or colloidal suspension. A colloidal suspension of functionalized metallic nanoparticles in water can have a pH of greater than 7, for example greater than about 7 to less than or equal to about 14, or greater than about 8 and less than about 12.

In another embodiment, a substrate for SERS comprises a first layer of functionalized metallic nanoparticles and a second layer of a support layer. The support layer comprises glass, silica, ceramics, a polymer such as polydimethylsiloxane, graphene, carbon nanotubes, silicon wafers, ceramics, ceramics, or a combination comprising at least one of the foregoing. The functionalized metallic nanoparticles can be deposited or coated on the support layer. Optionally, the functionalized nanoparticles are further aligned on the support layer by applying an AC electric field to the functionalized metallic nanoparticles. The alignment includes but is not limited to forming functionalized metallic nanoparticle chains on a surface of the support layer. Without wishing to be bound by theory, it is believed that the Raman signals for certain chemicals can be further enhanced by aligning the functionalized metallic nanoparticles.

The functionalized metallic nanoparticles can also be incorporated into a matrix such as glass, silica, or a polymer such as polydimethylsiloxane. There are at least two ways to incorporate functionalized metallic nanoparticles into a matrix. One way is to combine preformed functionalized metallic nanoparticles with a matrix material, and then forming the composite substrate by drop-casting, spin-coating, molding, extrusion, or the like. The other is to generate the composite substrate in situ by incorporating the matrix material in the reaction to produce functionalized metallic nanoparticles. After the solvent used in the reaction is removed, the mixture can be molded to form a composite substrate.

The substrate containing functionalized metallic nanoparticles can be used with a Raman spectrometer for performing SERS on a sample in order to detect the presence or concentration of a selected chemical in a well sample. In an embodiment, the sample is drawn from a fluid such as refinery fluid, a production fluid, cooling water, process water, drilling fluids, completion fluids, production fluids, crude oil, feed streams to desalting units, outflow from desalting units, refinery heat transfer fluids, gas scrubber fluids, refinery unit feed streams, refinery intermediate streams, finished product streams, and combinations thereof. As a specific example, the fluid is a hydrocarbon extracted from a reservoir in an earth formation or a further processed fluid thereof. A further processed fluid refers to a fluid that has been treated to remove undesired materials or solid, if any. As another specific example, the sample is an aqueous based fluid such as sour water or treated sour water. The sample can be directly analyzed. However, if desired, the sample can be pre-purified before being analyzed to remove undesired impurities in solid or liquid forms. Such pre-purification includes filtration, column treatment, and other methods known to a person skilled in the art.

The methods as disclosed herein can have a quick turn-around time. The total test time is less than about 10 minutes, less than about 8 minutes, or less than about 6 minutes.

The methods are effective to determine selected chemicals at a concentration of equal to or greater than about 1 parts per billion (ppb) to about 1,000 parts per million (ppm) or at a concentration of equal to or greater than about 1 ppm to about 1,000 ppm.

The results have excellent reproducibility. In an embodiment, the measured concentration of the selected chemical has a standard deviation of less than about 0.1%, less than about 1%, or less than about 5%. As used herein, standard derivation is calculated as the square root of variance by determining the variation between each data point relative to the mean.

Any Raman spectrometer known in the art can be used together with the substrate containing the functionalized metallic nanoparticles. In use, a sample is contacted with the substrate, and electromagnetic energy is directed at the sample from an energy source of the Raman spectrometer. The energy source can be a laser; and the electromagnetic energy can be a monochromatic beam provided at a frequency or energy level that is attuned to at least one of a vibrational or rotational excitation of the chemical of interest in the sample. The electromagnetic energy excites the electrons of the chemical of interest to a virtual energy state. As the excited electrons fall back into a lower energy state, it emits photons that can be either lower energy (Stokes scattering) or higher energy (anti-Stokes scattering) than the energy of the incident electromagnetic energy. The emitted photons are received at a detector of the spectrometer. The detector generates signals indicative of the energy of the received photon. The signals are then sent to a control unit for processing.

The control unit includes a processor, a memory storage device, generally a solid-state memory storage device, and one or more programs stored in the memory storage device and accessible to the processor. When the one or more programs are executed or run by the processor, the processor produces a spectrum of the emitted photons. The spectrum can be observed or reviewed in order to identify chemicals and relative chemical concentrations within the sample. The processor can determine the presence or absence of a selected chemical in the sample or determine the concentration of a chemical in the sample. The processor can also provide control signals to various components to control a level of the chemicals. The control unit can be part of the Raman spectrometer or can be independent of the Raman spectrometer.

Exemplary well treatment additives include scale inhibitors including polymeric scale inhibitors, corrosion inhibitors, paraffin inhibitors, salt formation inhibitors, asphaltene dispersants, foaming agents, hydrogen sulfide scavengers, demulsifying agents, hydrogen sulfide scavengers, biocides, surfactants, and combinations comprising at least one of the foregoing.

Scale inhibitors effectively inhibit, control, prevent or treat the formation of inorganic scale formations being deposited in subterranean formations. Scale inhibitors are particularly efficacious in the treatment of scales of calcium, barium, magnesium salts and the like, including barium sulfate, calcium sulfate, and calcium carbonate scales. Scale inhibitors may further have applicability in the treatment of other inorganic scales, such as zinc sulfide, iron sulfide, and the like.

Exemplary scale inhibitors include strong acidic materials such as a phosphonic acid, a phosphoric acid or a phosphorous acid, phosphate and sulphonate esters, phosphonate/phosphonic acids, the various aminopoly carboxylic acids, chelating agents, and polymeric inhibitors and salts thereof. Included are organo phosphonates, organo phosphates and phosphate esters as well as the corresponding acids and salts thereof. Preferred scale inhibitors are phosphonate compounds.

Phosphonate/phosphonic acid type scale inhibitors have effectiveness to control scales at relatively low concentrations. Polymeric scale inhibitors, such as polyacrylamides, salts of acrylamido-methyl propane sulfonate/acrylic acid copolymer (AMPS/AA) as well as P tagged versions which include P directly in the backbone, phosphinated maleic copolymer (PHOS/MA) or sodium salt of polymaleic acid/acrylic acid/acrylamido-methyl propane sulfonate terpolymers (PMA/AMPS), are also effective. Sodium salts of the foregoing may be employed.

Specific scale inhibitors include an amino trimethylene phosphonic acid (ATMP), 1-hydroxy ethylidene-1,1-diphosphonic acid (HEDP), 2-phosphonobutane-1,2,4-(tricarboxylic acid (PBTC), 2-hydroxyethyl-amino-bis(methylene-phosphonic acid (HEAMBP), ethylene diamine tetrakis (methylene phosphonic acid) (EDTMP), tetramethylenediamine-tetrakis-(methylene phosphonic acid) (TDTMP), hexamethylene diamine tetrakis (methylene phosphonic acid) (HDTMP), 2-hydroxy phosphonoacetic acid (HPAA), diethylene triamine penta(methylene phosphonic acid) (DT-MPM), bis (hexamethylene triamine penta (methylene phosphonic acid) (BHPMP), polyamino polyether methylene phosphonate (PAPEMP) or a salt thereof phosphino-polycarboxylate (PPCA), polyacrylate (PAA), polymaleic acid (PMA), an acrylic copolymer, sulfonate polyacrylate co-polymer, polyvinyl sulfonate, carboxymethyl inulin, polyaspratates and mixtures thereof. Preferred scale inhibitors include are chelating agents, including diethylenetriamine-pentamethylene phosphonic acid and ethylenediaminetetra acetic acid.

Scale inhibitors also include polymeric scale inhibitors, specifically polymeric scale inhibitors comprising fluorescent, phosphorus or quaternary amine tags. Fluoroescent tag means a monomer capable of fluorescing or a derivative thereof. As used herein, the term "tagged polymer" means a polymer composition, as described herein, that has a fluorescent tag, phosphorous tag or quaternary amine tag polymerized therein. The tagged polymers can be detected using the SERS methods described herein to determine, for example, how much scale inhibiting polymer composition is being delivered in the water source and/or how much scale inhibiting polymer composition is being exhausted during use.

Fluorescent tags include naphthalenes, anthracenes, quinolines, isoquinolines, indoles, pyrenes, benzimidazoles, coumarins, fluoresceins, quinoxalines, xanthyliums, borondipyrromethenes, bimanes, rhodamines, and naphthalimides. Specific monomers that can be used to fluorescently tag a polymer include but are not limited to 4-methoxy-N-(3-N',N'-dimethylaminopropyl)naphthalimide (quaternary salt), N-allyl-4-(2-N',N'-dimethylaminoethoxy)naphthalimide (methyl sulfate quaternary salt), 4-methoxy-N-(3-N',N'-dimethylaminopropyl) naphthalimide (allyl chloride quaternary salt), 5-allyloxy-4'-carboxy-1,8-naphthoylene-1',2'-benzimidazole, 6-vinylbenzyloxy-4'-carboxy-1,8-naphthoylene-1',2'-benzimidazole, 4-methoxy-N-(3-N',N'-dimethylaminopropyl)naphthalimide (2-hydroxy-3-allyloxypropyl quat), quaternary ammonium salt of dimethylaminopropylmethacrylamide and 2-(chloromethyl) quinoline, quaternary ammonium salt of dimethylaminopropylmethacrylamide and 9-(chloromethyl)anthracene, quaternary ammonium salt of dimethylaminopropylmethacrylamide and 2-(chloromethyl) benzimidazole, quaternary ammonium salt of dimethylaminopropylmethacrylamide and 4-(bromomethyl)pyrene, quaternary ammonium salt of dimethylaminopropylmethacrylamide and 1-(chloromethyl)naphthalene, any additional quaternary ammonium salt of dimethylaminopropylmethacrylamide and halo-alkyl derivative of the fluorescent chromophores previously listed, or any other fluorescent molecule capable of polymerizing with any of the above described scale inhibiting polymers.

Phosphorous tags include P directly incorporated into the polymer backbone such as in polyphosphinocarboxylic acids and copolymers thereof, P end capped polymers such as phosphonocarboxylic acids and copolymers thereof, vinyl phosphonic acid, and vinylidene phosphonic acid and other P containing monomers capable of polymerizing with scale inhibiting polymers.

Quaternary amine tags include diallyldimethylammonium chloride (DADMAC), (3-chloro-2-hydroxypropyl)trimethylammonum chloride (CHPTAC). N.n-dimethylaminoethylacrylate(DMAEA), (2 acryloyloxyethyl)trimethylammonium chloride (DMAEA-QUAT) and any other quaternary monomers capable of polymerizing with scale inhibiting polymers.

Exemplary polymeric scale inhibitors include acrylic acid, maleic acid, and methacrylic acid units. The polymers disclosed herein may inhibit scale formation when used at relatively low concentrations in water sources, such as below about 200 ppm. Polymers include copolymers, terpolymers, tetrapolymers, and pentapolymers which may facilitate selective inhibition of mineral scales in systems utilizing seawater, without the presence of phosphorous containing moieties.

Corrosion inhibitors include, but are not limited to, fatty imidazolines, alkyl pyridines, alkyl pyridine quaternaries, fatty amine quaternaries and phosphate salts of fatty imidazolines.

Exemplary paraffin inhibitors include ethylene/vinyl acetate copolymers, acrylates (such as polyacrylate esters and methacrylate esters of fatty alcohols), and olefin/maleic esters.

Exemplary salt formation inhibitors include those formed by joining a taggant with any of the fructans or fructan derivatives, such as inulin and inulin derivatives, as disclosed in U.S. Pat. No. 7,977,283, herein incorporated by reference. Other exemplary salt inhibitors include potassium ferrocyanide, nitrilotriacetic acid, nitrilotriacetamide, and sulfonated copolymers.

Exemplary asphaltene dispersants include fatty ester homopolymers and copolymers (such as fatty esters of acrylic and methacrylic acid polymers and copolymers) and sorbitan monooleate.

Exemplary foaming agents include oxyalkylated sulfates or ethoxylated alcohol sulfates, and combinations comprising at least one of the foregoing.

Exemplary hydrogen sulfide scavengers include triazines, maleimides, formaldehydes, amines, carboxamides, alkylcarboxyl-azo compounds cumine-peroxide compounds morpholino and amino derivatives morpholine and piperazine derivatives, amine oxides, alkanolamines, aliphatic, aromatic polyamines, and combinations comprising at least one of the foregoing.

Exemplary demulsifying agents include condensation polymers of alkylene oxides and glycols, such as ethylene oxide and propylene oxide condensation polymers of dipropylene glycol as well as trimethylol propane; and alkyl substituted phenol formaldehyde resins, bis-phenyl diepoxides, and esters and diesters of the di-functional products. Specific non-ionic demulsifiers are those prepared from oxyalkylated phenol formaldehyde resins, oxyalkylated amines and polyamines, di-epoxidized oxyalkylated polyethers, etc. Exemplary oil-in-water demulsifiers include poly triethanolamine methyl chloride quaternary, melamine acid colloid, aminomethylated polyacrylamide, and the like, and combinations comprising at least one of the foregoing.

Exemplary hydrogen sulfide scavengers include zinc, copper, iron, chromium, manganese, molybdenum, selenium, strontium, cobalt and vanadium based compounds. Copper-based compounds include caesium hexafluorocuprate(IV), calcium copper titanate, chlorophyllin, chromated copper arsenate, copper aspirinate, copper benzoate, copper chromite, copper gluconate, copper hydride, copper ibuprofenate, copper indium gallium selenide, copper monosulfide, copper oxide, copper peptide GHK-Cu, copper peroxide, copper salicylate, copper selenide, copper silicide, copper sulfide, copper usnate, copper(I) acetylide, copper(I) bromide, copper(I) chloride, copper(I) cyanide, copper(I) fluoride, copper(I) hydroxide, copper(I) iodide, copper(I) nitrate, copper(I) oxide, copper(I) phosphide, copper(I) sulfate, copper(I) sulfide, copper(I) thiocyanate, copper(I)-thiophene-2-carboxylate, copper(II) acetate, copper(II) arsenate, copper(II) azide, copper(II) bromide, copper(II) carbonate, basic copper carbonate, copper(II) chloride, copper(II) fluoride, copper(II) hydroxide, copper(II) nitrate, copper(II) oxide, copper(II) perchlorate, copper(II) phosphate, copper(II) selenite, copper(II) sulfate, copper(II) tetrafluoroborate, copper(II) triflate, copper(III) oxide, cuprate, copper borate, copper carboxylate, and combinations comprising at least one of the foregoing.

Exemplary biocides include aldehydes such as glutaraldehyde. Biocides also include non-oxidizing and oxidizing biocides. Exemplary oxidizing biocides include hypochlorite bleach (e.g., calcium hypochlorite and lithium hypochlorite), peracetic acid, potassium monopersulfate, potassium peroxymonosulfate, bromochlorodimethylhydantoin, dichloroethylmethylhydantoin, chloroisocyanurate, trichloroisocyanuric acids, dichloroisocyanuric acids, chlorinated hydantoins, and the like. Additional oxidizing biocides include bromine products such as stabilized sodium hypobromite, activated sodium bromide, or brominated hydantoins. Other oxidizing biocides include chlorine dioxide, ozone, inorganic persulfates such as ammonium persulfate, or peroxides, such as hydrogen peroxide and organic peroxides.

Exemplary non-oxidizing biocides include dibromonitfilopropionamide, thiocyanomethylthiobenzothlazole, methyldithiocarbamate, tetrahydrodimethylthladiazonethione, tributyltin oxide, bromonitropropanediol, bromonitrostyrene, methylene bisthiocyanate, chloro methylisothlazolone, methylisothiazolone, benzisothlazolone, dodecylguanidine hydrochloride, polyhexamethylene biguanide, tetrakis(hydroxymethyl) phosphonium sulfate, glutaraldehyde, alkyldimethylbenzyl ammonium chloride, didecyldimethylammonium chloride, poly[oxyethylene-(dimethyliminio) ethylene (dimethyliminio) ethylene dichloride], decylthioethanamine, terbuthylazine, and the like. Additional non-oxidizing biocides are quaternary ammonium salts, aldehydes and quaternary phosphonium salts. In an embodiment, quaternary biocides have a fatty alkyl group and three methyl groups, but in the phosphonium salts, the methyl groups, e.g., are substituted by hydroxymethyl groups without substantially affecting the biocidal activity. In an embodiment, they also are substituted with an aryl group. Examples include formaldehyde, glyoxal, furfural, acrolein, methacrolein, propionaldehyde, acetaldehyde, crotonaldehyde, pyridinium biocides, benzalkonium chloride, cetrimide, cetyl trimethyl ammonium chloride, benzethonium chloride, cetylpyridinium chloride, chlorphenoctium amsonate, dequalinium acetate, dequalinium chloride, domiphen bromide, laurolinium acetate, methylbenzethonium chloride, myristyl-gamma-picolinium chloride, ortaphonium chloride, triclobisonium chloride, alkyl dimethyl benzyl ammonium chloride, cocodiamine, dazomet, 1-(3-chloroallyl)-chloride. 3,5,7-triaza-1-azoniaadamantane, or a combination thereof Exemplary surfactants include cationic, amphoteric, anionic and nonionic surfactants. Included as cationic surfactants are those containing a quaternary ammonium moiety (such as a linear quaternary amine, a benzyl quaternary amine or a quaternary ammonium halide), a quaternary sulfonium moiety or a quaternary phosphonium moiety and mixtures thereof. Exemplary well treatment additives joined with a taggant to form a surfactant include a quaternary group include quaternary ammonium halide or quaternary amine, such as quaternary ammonium chloride or a quaternary ammonium bromide. Included as amphoteric surfactants are those prepared by joining a taggant with glycinates, amphoacetates, propionates, betaines and mixtures thereof. The cationic or amphoteric surfactant may have a hydrophobic tail (which may be saturated or unsaturated) such as a $C_{12}$-$C_{18}$ carbon chain length. Further, the hydrophobic tail may be obtained from a natural oil from plants such as one or more of coconut oil, rapeseed oil and palm oil.

Specific surfactants include N,N,N trimethyl-1-octadecammonium chloride: N,N,N trimethyl-1-hexadecammonium chloride; and N,N,N trimethyl-1-soyaammonium chloride, and mixtures thereof. Specific anionic surfactants include sulfonates (such as sodium xylene sulfonate and sodium naphthalene sulfonate), phosphonates, ethoxysulfates and combinations comprising at least one of the foregoing.

The invention is further illustrated by the following non-limiting examples.

Example 1: Differentiation of Phosphonate Scale Inhibitors

Figure 1:
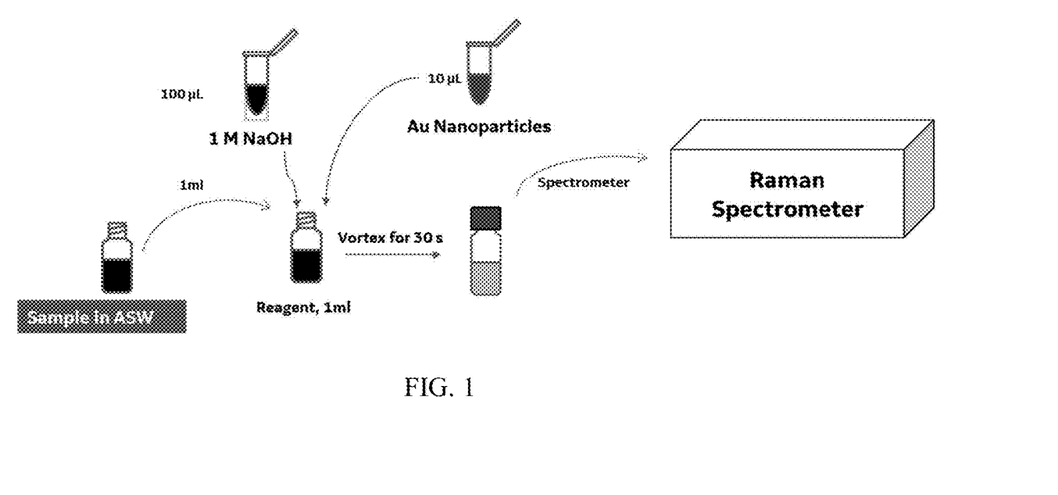
FIG. 1 shows a schematic of a SERS based method of scale inhibitor analysis.
Figure 2:
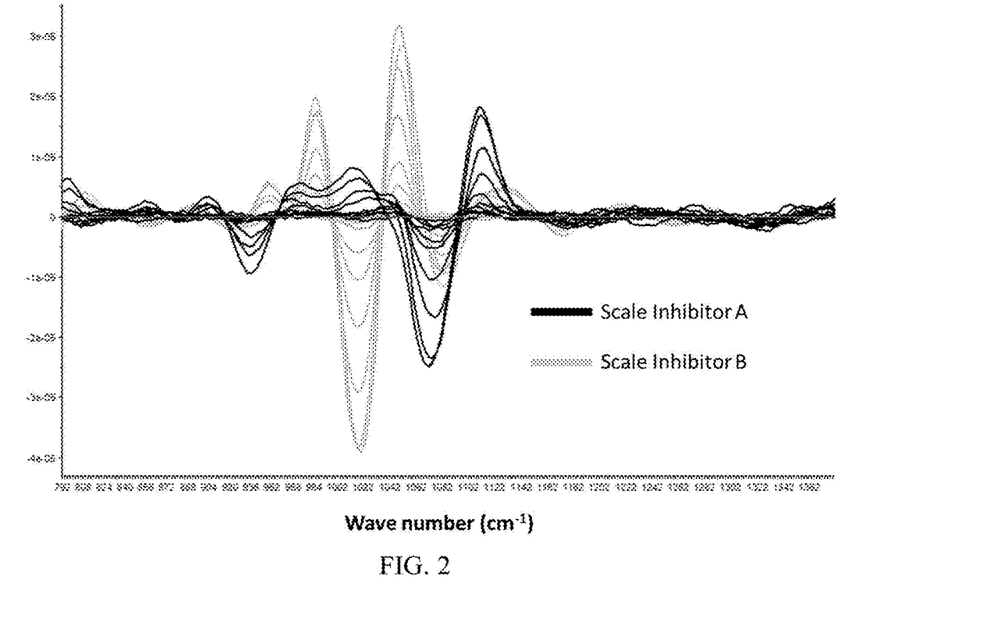
FIG. 2 shows a comparison of differential Raman spectra for two different phosphonate based scale inhibitors, A and B.

FIG. 1 shows a schematic of a SERS based method of scale inhibitor analysis. Scale inhibitor A and Bare commonly used phosphonate based scale inhibitors. Scale inhibitors A and B were dissolved in water and artificial sea water (ASW) at oncentrations of 100 ppb, and the Raman spectra were determined using Au nanoparticles. As shown in FIG. 2, the two phosphonate compounds can be distinguished at concentrations of 10 ppb.

Figure 3:
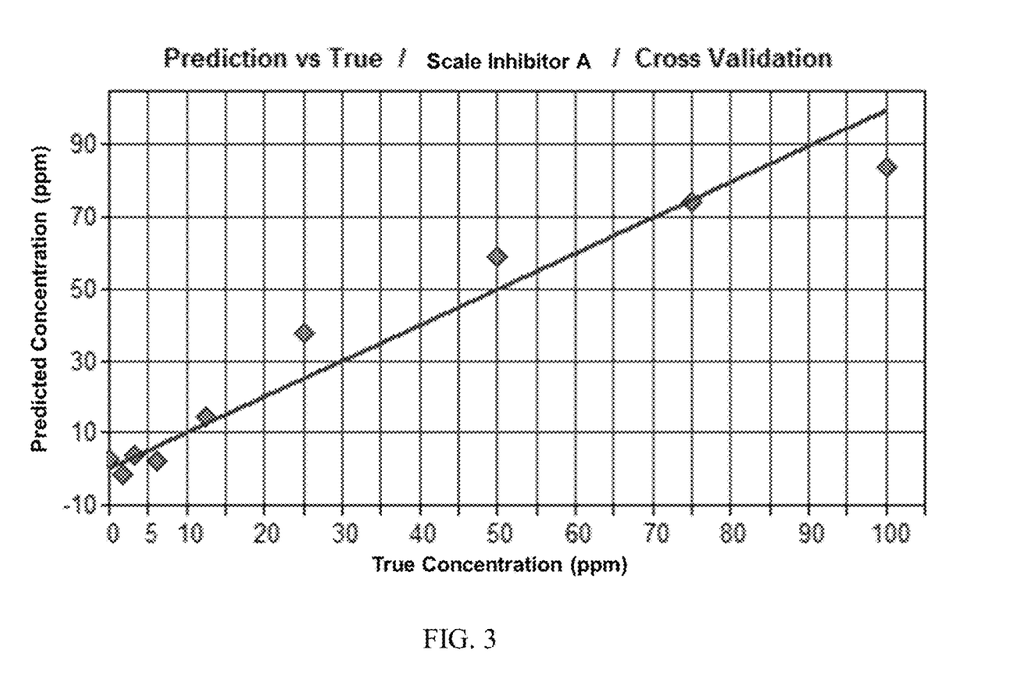
FIG. 3 shows the calibration curve for scale inhibitor A.
Figure 4:
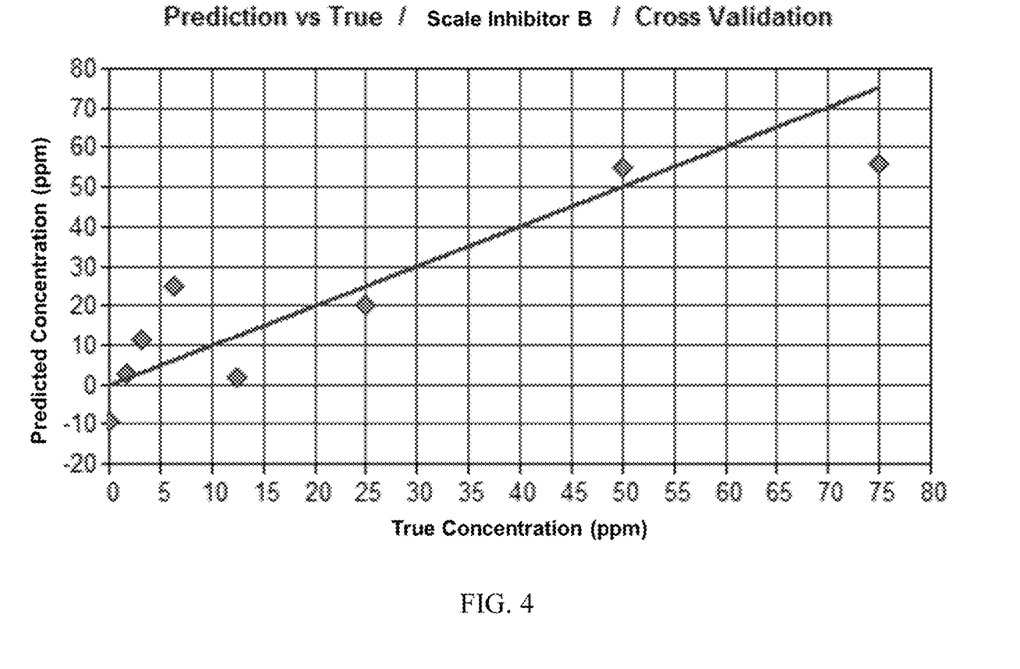
FIG. 4 shows the calibration curve for scale inhibitor B
Figure 5:
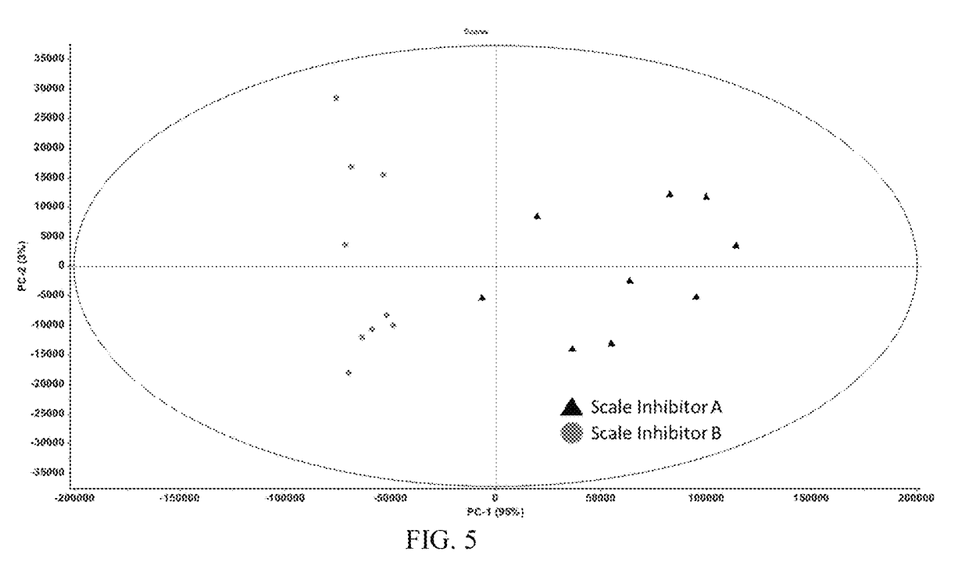
FIG. 5 shows principal component analysis of the SERS data for scale inhibitor A and scale inhibitor B.

Various concentrations of scale inhibitor A and scale inhibitor B were prepared in the range of 1 to 100 ppm. First 1 ml of the stock solution was added to 1 mL of ASW and 100 μL of NAOH was added. After addition of NaOH, a coagulate formed providing a turbid solution. Then 10 μL of cyano-functionalized gold nanoparticles were added. The solution was vortexed for 230 seconds to provide a homogeneous dispersion for analysis. SERS analysis was performed to provide calibration curves. Figures. 3 and 4 show the calibration curves for scale inhibitor A and scale inhibitor B, respectively. As shown in FIG. 6, further analysis of the SERS data for scale inhibitor A and scale inhibitor B shows a clear difference in spectral signature and variation with concentration. As shown in FIG. 7, principle component analysis shows the differentiation between scale inhibitor A and scale inhibitor Bat different low concentrations.

Set forth below are some embodiments of the foregoing disclosure.

Embodiment 1

A method of analyzing a well sample for a well treatment additive, the method comprising contacting the sample with functionalized metallic nanoparticles that contain metallic nanoparticles functionalized with a functional group comprising a cyano group, a thiol group, a carboxyl group, an amino group, a boronic acid group, an aza group, an ether group, a hydroxyl group, or a combination comprising at least one of the foregoing; irradiating the sample contacted with the functionalized metallic nanoparticles with electromagnetic radiation at a selected energy level; measuring a Raman spectrum emitted from the sample; and determining presence, type or concentration of the well treatment additive in the sample from the Raman spectrum.

Embodiment 2

The method of claim 1, wherein the well sample comprises a refinery fluid, a production fluid, cooling water, process water, a drilling fluid, a completion fluid, a production fluid, crude oil, a feed stream to a desalting unit, outflow from a desalting unit, a refinery heat transfer fluid, a gas scrubber fluid, a refinery unit feed stream, a refinery intermediate streams, a finished product streams, or a combination comprising at least one of the foregoing.

Embodiment 3

The method as in any prior embodiment, wherein the well treatment additive is a scale inhibitor, a corrosion inhibitor, a paraffin inhibitor, a salt formation inhibitor, an asphaltene dispersant, a foaming agent, an oxygen scavenger, a demulsifying agent, a hydrogen sulfide scavenger, a biocide, a surfactants, or a combination comprising at least one of the foregoing.

Embodiment 4

The method as in any prior embodiment, wherein the well treatment additive is a scale inhibitor or a corrosion inhibitor.

Embodiment 5

The method as in any prior embodiment, wherein the scale inhibitor comprises a phosphonate compound or a polymeric scale inhibitor.

Embodiment 6

The method as in any prior embodiment, wherein determining presence, type or concentration of the well treatment additive in the sample from the Raman spectrum comprises identifying two or more species of well treatment additive in the sample.

Embodiment 7

The method as in any prior embodiment, further comprising calibrating the measured concentration of the well treatment additive in the sample with a Raman peak of the functionalized metallic nanoparticles used as an internal standard.

Embodiment 8

The method as in any prior embodiment, wherein no internal standards are used together with functionalized metallic nanoparticles

Embodiment 9

The method as in any prior embodiment, wherein the functional group comprises a cyano group.

Embodiment 10

The method as in any prior embodiment, wherein the functional group is covalently bonded to the metallic nanoparticles.

Embodiment 11

The method as in any prior embodiment, wherein the functionalized metallic nanoparticles comprise gold nanoparticles functionalized with a cyano group, and the functionalized metallic nanoparticles are free of sulfur or any sulfur-containing moieties.

Embodiment 12

The method as in any prior embodiment, wherein the functionalized metallic nanoparticles are present in a sol or colloidal suspension.

Embodiment 13

The method as in any prior embodiment, wherein the functionalized metallic nanoparticles are disposed on a support layer.

Embodiment 14

The method as in any prior embodiment, wherein the support layer comprises glass, silica, graphene, carbon nanotubes, ceramics, a polymer, or a combination comprising at least one of the foregoing.

Embodiment 15

The method as in any prior embodiment, wherein the functionalized metallic nanoparticles are disposed in a matrix comprising glass, silica, ceramics, or a polymer.

Embodiment 16

The method as in any prior embodiment, wherein the method is effective to determine the well treatment additive at a concentration of equal to or greater than about 1 parts per billion to about 1,000 parts per million with a standard deviation of about 0.1% to about 5%.

Embodiment 17

The method as in any prior embodiment, wherein the functionalized metallic particles have an average particle size of about 5 nanometers to about 350 micrometers.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A method of analyzing a well sample for a well treatment additive, the method comprising:

contacting the sample with functionalized metallic nanoparticles that contain metallic nanoparticles functionalized with a cyano functional group;

irradiating the sample contacted with the functionalized metallic nanoparticles with electromagnetic radiation at a selected energy level;

measuring a Raman spectrum emitted from the sample; and determining presence, type or concentration of the well treatment additive in the sample from the Raman spectrum.

2. The method of claim 1, wherein the well sample comprises a refinery fluid, a production fluid, cooling water, process water, a drilling fluid, a completion fluid, a production fluid, crude oil, a feed stream to a desalting unit, outflow from a desalting unit, a refinery heat transfer fluid, a gas scrubber fluid, a refinery unit feed stream, a refinery intermediate streams, a finished product streams, or a combination comprising at least one of the foregoing.

3. The method of claim 1, wherein the well treatment additive is a scale inhibitor, a corrosion inhibitor, a paraffin inhibitor, a salt formation inhibitor, an asphaltene dispersant, a foaming agent, an oxygen scavenger, a demulsifying agent, a hydrogen sulfide scavenger, a biocide, a surfactants, or a combination comprising at least one of the foregoing.

4. The method of claim 1, wherein the well treatment additive is a scale inhibitor or a corrosion inhibitor.

5. The method of claim 4, wherein the scale inhibitor comprises a phosphonate compound or a polymeric scale inhibitor.

6. The method of claim 1, wherein determining presence, type or concentration of the well treatment additive in the sample from the Raman spectrum comprises identifying two or more species of well treatment additive in the sample.

7. The method of claim 1, further comprising calibrating the measured concentration of the well treatment additive in the sample with a Raman peak of the functionalized metallic nanoparticles used as an internal standard.

8. The method of claim 1, wherein no internal standards are used together with functionalized metallic nanoparticles.

9. The method of claim 1, wherein the functional group is covalently bonded to the metallic nanoparticles.

10. The method of claim 1, wherein the functionalized metallic nanoparticles comprise gold nanoparticles functionalized with a cyano group, and the functionalized metallic nanoparticles are free of sulfur or any sulfur-containing moieties.

11. The method of claim 1, wherein the functionalized metallic nanoparticles are present in a sol or colloidal suspension.

12. The method of claim 1, wherein the functionalized metallic nanoparticles are disposed on a support layer.

13. The method of claim 12, wherein the support layer comprises glass, silica, graphene, carbon nanotubes, ceramics, a polymer, or a combination comprising at least one of the foregoing.

14. The method of claim 1, wherein the functionalized metallic nanoparticles are disposed in a matrix comprising glass, silica, ceramics, or a polymer.

15. The method of claim 1, wherein the method is effective to determine the well treatment additive at a concentration of equal to or greater than about 1 parts per billion to about 1,000 parts per million with a standard deviation of about 0.1% to about 5%.

16. The method of claim 1, wherein the functionalized metallic particles have an average particle size of about 5 nanometers to about 350 micrometers.

17. The method of claim 1, wherein the well sample is an aqueous or hydrocarbon liquid well sample.

18. A method of analyzing a well sample for a well treatment additive, the method comprising:

contacting the sample with functionalized metallic nanoparticles comprising gold nanoparticles functionalized with a cyano group, and the functionalized metallic nanoparticles are free of sulfur or any sulfur-containing moieties;

irradiating the sample contacted with the functionalized metallic nanoparticles with electromagnetic radiation at a selected energy level;

measuring a Raman spectrum emitted from the sample; and determining presence, type or concentration of the well treatment additive in the sample from the Raman spectrum.

* * * * *